United States Patent
Carusi et al.

(10) Patent No.: US 7,712,077 B2
(45) Date of Patent: May 4, 2010

(54) METHOD AND SYSTEM FOR INSTANTIATING COMPONENTS CONFORMING TO THE "COM" SPECIFICATION IN CUSTOM CONTEXTS

(75) Inventors: Francesco Carusi, Rome (IT); Vincenzo Sciacca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 11/034,547

(22) Filed: Jan. 13, 2005

(65) Prior Publication Data

US 2005/0193392 A1    Sep. 1, 2005

(30) Foreign Application Priority Data

Feb. 27, 2004  (EP) ................... 04368013

(51) Int. Cl.
*G06F 9/44* (2006.01)
*G06F 9/445* (2006.01)
*G06F 15/16* (2006.01)
*H04L 29/06* (2006.01)

(52) U.S. Cl. .............. 717/107; 717/121; 717/174; 709/219; 713/164; 713/166

(58) Field of Classification Search .......... None
See application file for complete search history.

(56) References Cited

U.S. PATENT DOCUMENTS 6,604,198 B1* 8/2003 Beckman et al. ......... 713/167
6,988,271 B2* 1/2006 Hunt ....................... 719/315
2002/0032804 A1* 3/2002 Hunt ....................... 709/320
2002/0104068 A1* 8/2002 Barrett et al. ............. 717/104
2005/0226406 A1* 10/2005 Forin et al. ................ 380/1

OTHER PUBLICATIONS

Clarke et al., "An Efficient Component Model for the Construction of Adaptive Middleware", 2001, Springer-Verlag Berlin Heidelberg, pp. 160-178.*

Coulson et al., "The design of a configurable and reconfigurable middleware platform", 2002, Springer-Verlag, pp. 109-126.*

* cited by examiner

*Primary Examiner*—Michael J Yigdall
*Assistant Examiner*—Ben C Wang
(74) *Attorney, Agent, or Firm*—Garg Law Firm, PLLC; Rakesh Garg; Jeffrey S LaBaw (57) ABSTRACT

A method and system for instantiating COM components in custom contexts are proposed. The solution of the invention is based on an auxiliary component, acting as a factory (215). Whenever a client (205) needs to instantiate a new target component in a desired custom context, it calls a dedicated method exposed by the factory, passing the identifier of the target component together with information about the custom context. The factory starts execution of an additional module, operating as an impersonator (225), in a new process (230) conforming to the custom context. The impersonator then instantiates the target component in its own process. The impersonator passes a pointer for the target component to the factory (calling a further method that is exposed by the factory); the factory in turn returns that pointer to the client.

14 Claims, 7 Drawing Sheets

METHOD AND SYSTEM FOR INSTANTIATING COMPONENTS CONFORMING TO THE "COM" SPECIFICATION IN CUSTOM CONTEXTS

TECHNICAL FIELD

The present invention relates to the data processing field, and more specifically to a method and a corresponding system for instantiating software components.

BACKGROUND ART

Development and maintenance of software applications are critical issues in modern data processing systems. For this purpose, several technologies have been proposed in the last years to facilitate the reuse of software code and the integration of preexisting solutions.

Particularly, in a component-based infrastructure the software applications are built combining program blocks (called components). A component consists of a self-describing object providing a well-specified set of publicly available services; in this way, multiple components can run together and each of them is able to understand and exploit the capabilities of the other components.

A typical example of a component-based infrastructure is the one conforming to the Component Object Model (COM) specification, as described at "http://msdn.microsoft.com/library/". In the COM specification, each component concretely implements predefined interfaces (consisting of abstract definitions of the supported services). The COM specification provides a versatile and completely language-independent infrastructure, which easily fits into an object-oriented program design.

Each component conforming to the COM specification is instantiated by a client requiring its services; for this purpose, the client calls a corresponding method (being exposed by a basic interface). The component can be instantiated in the process of the client (in-process), so as to run in the same environment context. Alternatively, the component can be instantiated in a different process (out-of-process) by means of a system service; in this case, the component inherits the properties of the context of the system service. However, in both cases the client cannot alter the setting of the context wherein the component runs.

The COM specification also allows selecting a desired instantiation mode for the component; the instantiation mode is chosen from a list of options that are available for the component (such as in-process or out-of-process). Even in this case, the client is bound to a set of predefined contexts.

Therefore, the client cannot instantiate the desired component in a custom context that is defined at run-time.

In other words, no support is available in the prior art for controlling the context of the components dynamically.

This problem is particularly acute for in-process components that are provided by third parties. Indeed, those components can only run in the same process of the client; as a consequence, it is not possible to customize their context in any way.

SUMMARY OF THE INVENTION

It is an object of the present invention to provide a method and a corresponding system for instantiating the components in custom contexts.

It is another object of the present invention to allow defining the contexts of the components at run-time.

It is yet another object of the present invention to provide a support for controlling the context of the components dynamically.

The accomplishment of these and other related objects is achieved by a method of instantiating software components, each component conforming to a component-based specification requiring the instantiation in at least one predefined context, wherein the method includes the steps under the control of an auxiliary component of: receiving a request from a client, the request including an indication of a target component and a corresponding target context, causing the instantiation of the target component in a target process being configured according to the target context, and returning an identifier for accessing the target component to the client.

The present invention also provides a computer program for performing the method and a product embodying the program.

Moreover, a corresponding system for instantiating software components is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
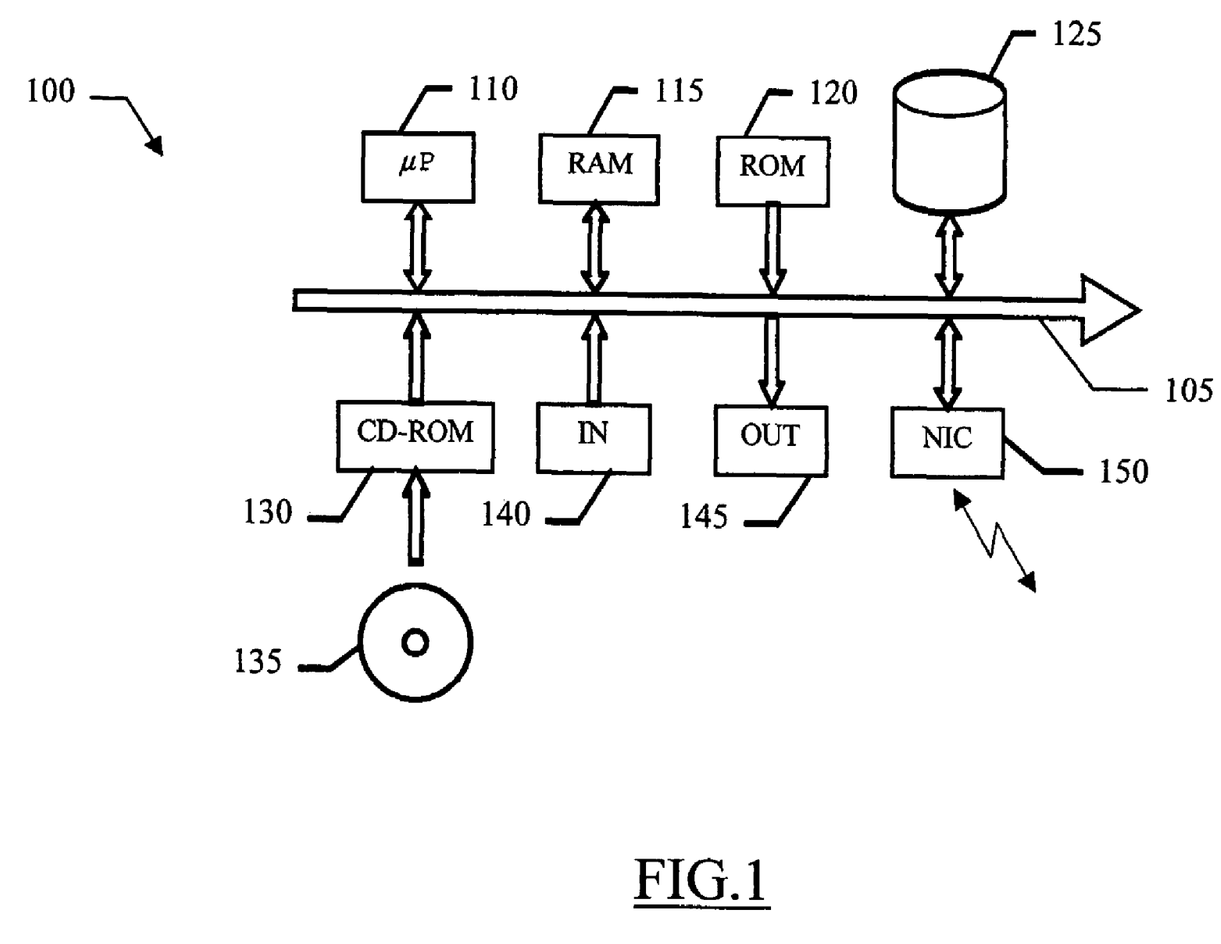
FIG. 1 is a schematic block diagram of a computer in which the method of the invention is applicable.

With reference in particular to FIG. 1, a computer 100 (such as PC) is shown. The computer 100 is formed by several units that are connected in parallel to a communication bus 105. In detail, a microprocessor (μP) 110 controls operation of the computer 100, a RAM 115 is directly used as a working memory by the microprocessor 110, and a ROM 120 stores basic code for a bootstrap of the computer 100. Several peripheral units are further connected to the bus 105 (by means of respective interfaces). Particularly, a mass memory consists of a magnetic hard-disk 125 and a driver 130 for reading CD-ROMs 135. Moreover, the computer 100 includes input devices 140 (for example, a keyboard and a mouse), and output devices 145 (for example, a monitor and a printer). A network Interface Card (NIC) 150 is used to connect the computer 100 to a network.

The above-described computer supports a component-based infrastructure, preferably conforming to the COM specification. In the COM specification, each component consists of an object, which instantiates a corresponding class implementing one or more predefined interfaces.

An interface is a language-neutral definition of the services that are made available; particularly, the interface specifies one or more associated methods and their behavior (in term of the respective signature, i.e., the type of arguments and results). An interface can inherit from another; in this case, the interface includes all the methods of the other interface, with the addition of new methods and/or the further qualification of the preexisting methods. Every interface has its own Globally Unique Identifier (GUID), which is called Interface Identifier (IID). The interfaces are immutable (so that any new version thereof defines a different interface).

Each class concretely implements the methods of the corresponding interfaces (in a specific language, such as C++ or Java™). Java is a trademark of Sun Microsystems, Inc., in the United States and other countries. The implementations of the most common interfaces are provided in libraries that are publicly available (even if they can be ignored and replaced with custom implementations). The class is identified by a corresponding GUID, which is called Class Identifier (CLSID).

When the class is instantiated, a corresponding component is created; the component consists of real program code that can be executed in the computer (to carry out the actions specified in its interfaces). The component is instantiated by any software module (called client), which requests the services supported by the component (called server). The component can be either in-process (i.e., implemented by a DLL that runs in the same process of the client) or out-of-process (i.e., implemented by an executable file that runs in a distinct process).

The component is only accessed through pointers to (the implementation of) its interfaces. The pointer to each interface identifies a Virtual Table (VTable), which consists of an array of pointers to the methods that are exposed by the interface. In this way, any client having a pointer to an interface of a component can get access to its VTable and call the desired methods.

The COM specification defines certain basic interfaces that provide common methods required by every component. Particularly, all the interfaces inherit (directly or indirectly) from the interface "IUnknown", which is used to control the access to the different interfaces of the component. For this purpose, the interface "IUnknown" exposes the fundamental methods "QueryInterface", "AddRef" and "Release".

The method "QueryInterface" allows accessing a desired interface of a component. Particularly, the method "QueryInterface" receives the IID of the interface and returns the corresponding pointer.

The method "AddRef" increments a counter indicating the number of references to the component; the method "AddRef" does not require any argument, and returns the value of the reference counter. The method "AddRef" is called for any new copy of the pointer to an interface of the component (for example, when the method "QueryInterface" is executed, when the pointer is passed to or is returned from a method, and the like).

Conversely, the method "Release" decrements the reference counter of the component; the method "AddRef" does not require any argument, and returns the value of the reference counter. The method "Release" is called whenever the pointer to an interface of the component is no longer needed (for example, before returning from a method that received the pointer as an argument). When the last reference to the component is released (i.e., the corresponding counter falls to 0), the component itself is removed.

Moreover, all the classes implement the interface "IClassFactory", which is used to control their instantiation. For this purpose, the interface "IClassFactory" exposes the methods "CreateInstance" and "LockServer".

The method "CreateInstance" allows instantiating an uninitialized component for the class. The method "CreateInstance" receives the IID of an initializing interface (to be used to communicate with the new component) and returns the corresponding pointer.

The method "LockServer" loads and locks the class in the working memory. This method allows instantiating any further component for the same class more quickly (since the class must not be reloaded).

The instantiation of a new component is typically performed by calling the system method "CoGetClassObject", which locates and gives access to the corresponding class. The method "CoGetClassObject" receives the CLSID of the desired class and the IID of the interface to be used to start communication (typically, the interface "IClassFactory"). The method "CoGetClassObject" also allows selecting a preferred instantiation mode (through the parameter "dwClsContext"). Particularly, it is possible to specify that the component must be instantiated in-process, out-of-process or in a list of predefined instantiation modes (being tried in their order); the available options are predefined in a system structure (CLSCTX enumeration). The method "CoGetClassObject" returns the pointer to the interface "IClassFactory". The component is then instantiated by calling the method "CreateInstance" on that interface.

The COM specification also supports the definition of containment relationships, which specify the dependencies that some components have on other components for access. In this condition, the components are organized into a hierarchy; access to a particular component in the hierarchy (called container) enables access to the other components that are directly dependent thereon. For this purpose, the container wraps each inner component; the container receives all the calls for the inner component, and can decide which calls to delegate to the inner component and which calls to handle directly. On the other hand, the release of the container involves the automatic release of all its dependent components. The containment technique is typically used when it is necessary to modify the behavior of the inner components.

Similar considerations apply if the computer has another architecture or includes different units. Alternatively, the computer is replaced with a Personal Digital Assistant (PDA), a mobile telephone, or any other data processing system; moreover, the system can have a distributed architecture (for example, based on the Internet). In any case, the concepts of the present invention are also applicable when the components conform to an equivalent specification; for example, the infrastructure can be based on the COM+ (extending the COM with the addition of a set of system services, such as the support of notifications and authorization controls), or the DCOM (providing remote instantiation on different computers), and the like.

Figure 2A:
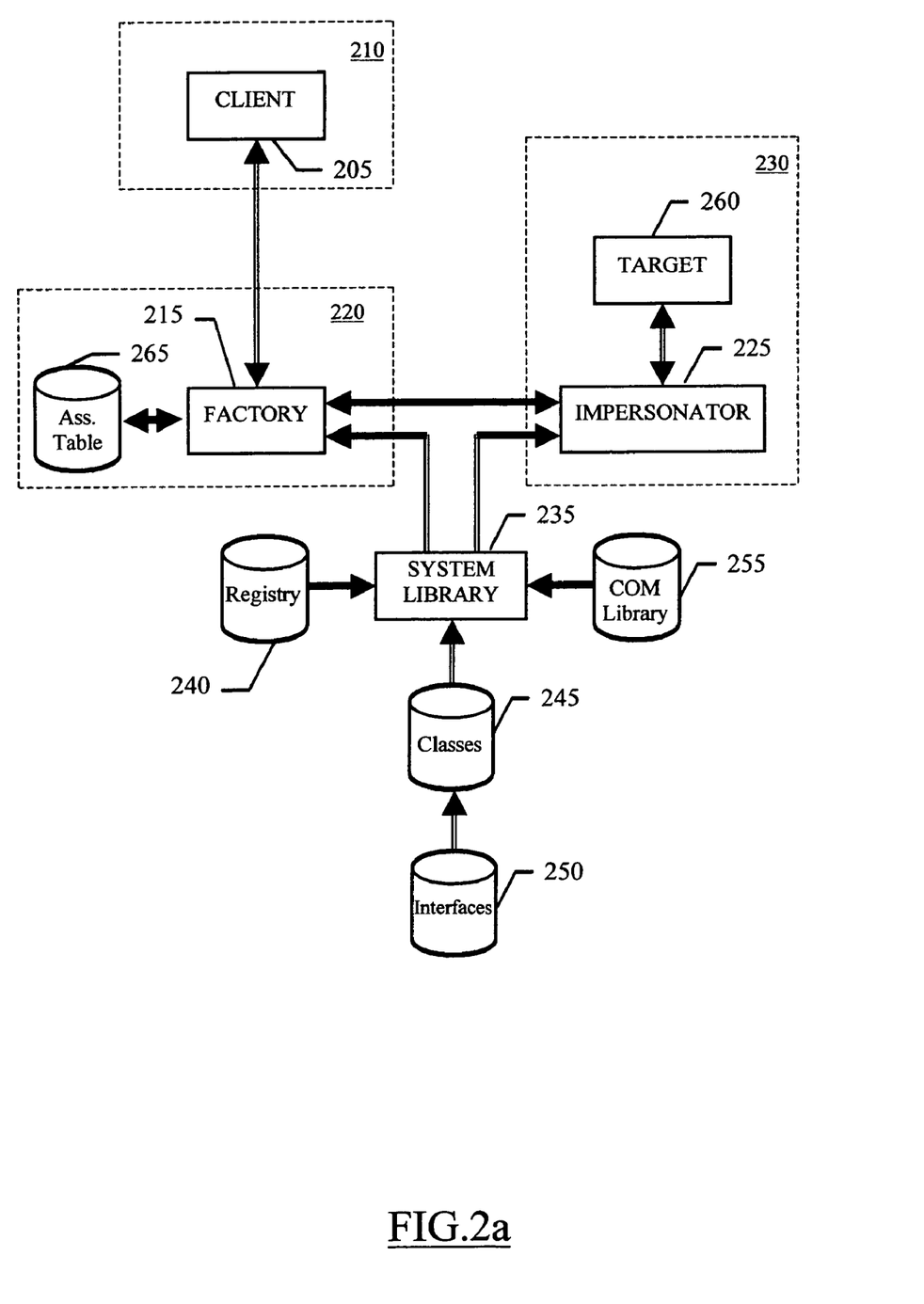
FIG. 2a depicts the main software components that can be used for practicing the method according to an embodiment of the invention.

Considering now FIG. 2a, the main software components that can be used for implementing the method according to an embodiment of the present invention are illustrated. The information (programs and data) is typically stored on the hard-disk and loaded (at least partially) into the working memory when the programs are running. The programs are initially installed onto the hard-disk from CD-ROM.

A client 205 (consisting of a software module either or not conforming to the COM specification) runs in its own process (or task) 210. Whenever the client 205 needs to instantiate a new target component in a custom context, a corresponding request is transmitted to a predefined component 215 operating as a factory (which runs in its own process 220). The factory 215 instantiates a software module 225 called impersonator (either or not conforming to the COM specification); each instance of the impersonator 225 runs in a corresponding process 230 conforming to the custom context.

The factory 215 exploits a system library 235 that provides a number of Application Program Interfaces (APIs). The system library 235 accesses a registry 240, which associates each class that has been registered on the computer (for example, through a human-readable name) with its CLSID. The system library 235 also accesses a repository 245 (storing the code of the classes), which in turn accesses a repository 250 (storing the definition of the corresponding interfaces); in addition, the system library 235 exploits a COM library 255 that provides the implementations of the most common interfaces.

The impersonator 225 in turn instantiates (through the system library 235) the desired target component 260 in its own process 230. The association between each target component 260 and the corresponding impersonator process 230 (identified by its handle) is stored into a table 265, which is managed by the factory 215; the association table 265 is also used to assign a unique identifier to each target component 260 (being instantiated through the factory 215).

A pointer for accessing the target component 260 (either directly or through the impersonator 225 acting as a container) is returned to the client 205 (through the impersonator 225 and the factory 215). That pointer is then used by the client 205 for exploiting the services provided by the target component 260.

Figure 2B:
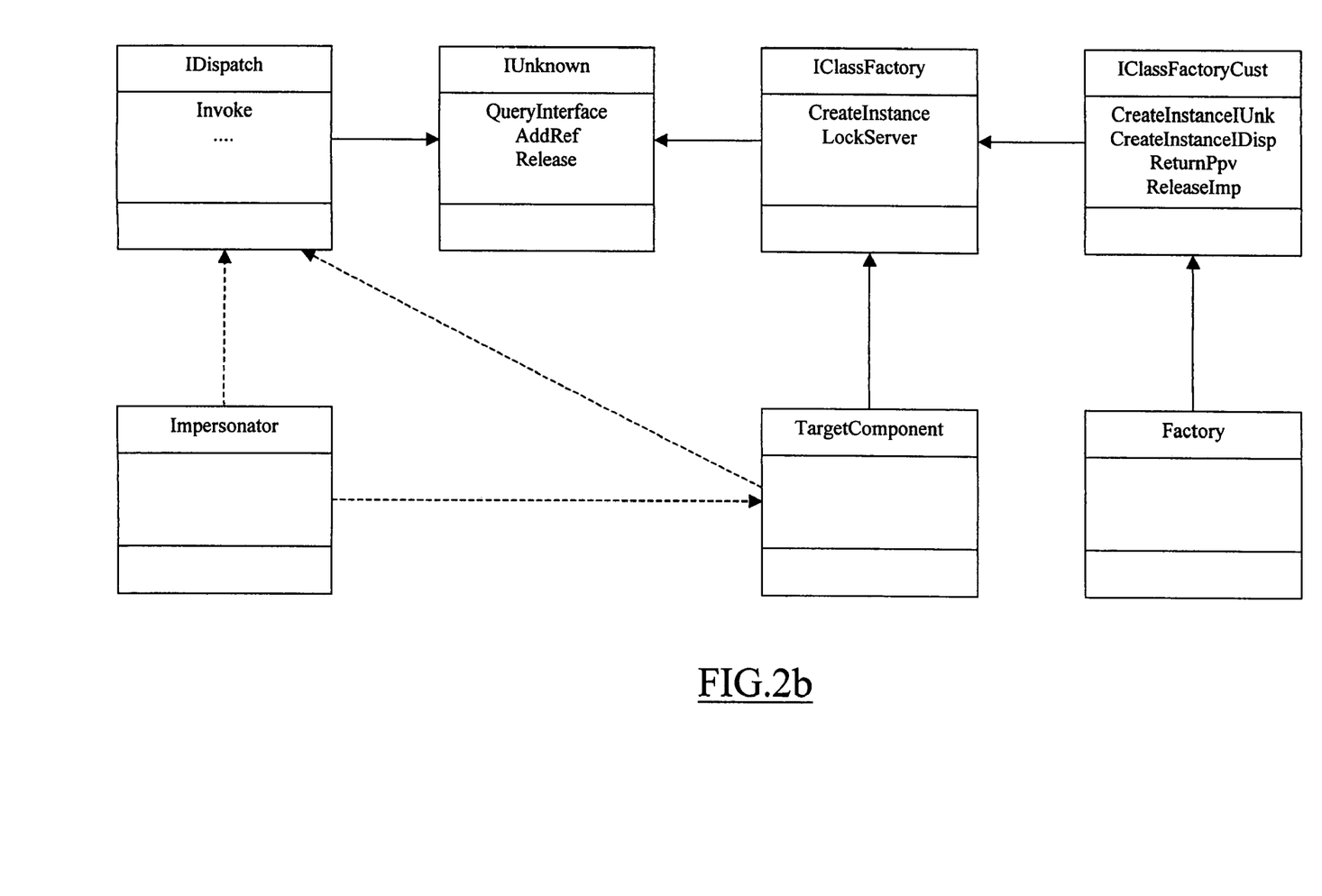
FIG. 2b illustrates a corresponding class diagram.

A corresponding class diagram is illustrated in FIG. 2b. The class diagram includes the interface "IUnknown", with the corresponding methods "QueryInterface", "AddRef" and "Release". The interface "IClassFactory" (with the methods "CreateInstance" and "LockServer") inherits from the interface "Iunknown".

Each target component implements the interface "IClassFactory". Moreover, the target component can also implement the interface "IDispatch", which is used in the COM specification to support automation. For this purpose, the interface "IDispatch" exposes (inter-alias) the method "Invoke".

The method "Invoke" allows automation clients (such as VisualBasic, ActiveX, and the like) to access the methods and properties exposed by server components. The method "Invoke" receives a flag specifying the type of operation to be performed (such as call a method, get or set a property), a dispatch identifier of the element (called member) to be invoked, a pointer to an array of arguments to be passed, a pointer to a location where the result of the operation is to be stored, and a pointer to a structure containing any exception information.

When the target component implements the interface "IDispatch", the impersonator preferably consists of a COM component as well. In this case, the impersonator implements the interface "IDispatch", and acts as a container wrapping the target component.

The above-described solution requires a new interface "IClassFactoryCust", which is implemented by the factory. The interface "IClassFactoryCust" is used to control the instantiation of the target components in the desired custom contexts. For this purpose, the interface "IClassFactoryCust" inherits from the interface "IClassFactory" and exposes the new methods "CreateInstanceIUnk", "CreateInstanceIDisp", "ReturnPpv" and "ReleaseImp".

The methods "CreateInstanceIUnk" and "CreateInstanceIDisp" instantiate the impersonator in a process conforming to the custom context, and in turn causes the impersonator to instantiate the target component in its own process; in addition, the method "CreateInstanceIDisp" also causes the impersonator to wrap the target component (as a container).

The methods "CreateInstanceIUnk" and "CreateInstanceIDisp" receive the CLSID of the class of the target component. The methods "CreateInstanceIUnk" and "CreateInstanceIDisp" also receives the IID of the initializing interface and returns a corresponding pointer (as the method "CreateInstance" does); particularly, the method "CreateInstanceIUnk" returns the pointer to the initializing interface of the target component, whereas the method "CreateInstanceIDisp" returns the pointer to the initializing interface of the impersonator. In addition, the methods "CreateInstanceIUnk" and "CreateInstanceIDisp" allow passing information specifying the custom context for the new process to be created. The context information defines the domain in which the target component will run (in term of system resources that are available and their configuration). For example, the context information specifies security, scheduling priority and/or appearance properties of the process. Preferably, the context information also includes a pointer to an environment block; the environmental block consists of a string of name/value pairs, each one defining a corresponding environment variable (such as a current drive, a current directory, and so on). The context information also allows specifying a user (different from the one associated with the client) to be impersonated by the process wherein the target component will run.

The method "ReturnPpv" is called by the impersonator to pass the pointer to the initializing interface of the target component (after its instantiation) to the factory.

The method "ReleaseImp" is used to terminate the impersonator process; this method is called by the client after releasing the target component (being instantiated using the method "CreateInstanceIUnk"). The method "ReleaseImp" receives the identifier of the target component (which is used to extract the handle to the impersonator process from the association table).

Similar considerations apply if the programs and the corresponding data are structured in a different way, or if the programs are distributed on any other computer readable medium (such as a DVD). Moreover, the concepts of the present invention are also applicable when other classes, interfaces, and/or methods are envisaged; for example, the factory can implement an interface that exposes a single method for instantiating the target components (being called passing a flag specifying whether the impersonator must wrap or not the target component). Alternatively, the custom context can be defined in a different way, or with other properties.

Referring now to FIGS. 3a-3d, the flow of activity of a method 300 implementing an embodiment of the present invention is illustrated. The method begins at the black start circle 302 in the swim-lane of the client. Whenever the client needs to instantiate a new target component in a desired custom context, the method descends into block 304. In this phase, the client calls either the method "CreateInstanceIUnk" or the method "CreateInstanceIDisp" on the factory (assuming that the client has already get a pointer to the corresponding interface "IClassFactoryCust"); at the same time, the client passes the CLSID of the class of the target component, the IID of the desired initializing interface and the context information. Particularly, the client calls the method "CreateInstanceIDisp" when the class of the target component implements the interface "IDispatch" (which is set as the initializing interface); on the contrary, the client calls the method "CreateInstanceIUnk".

Figure 3A:
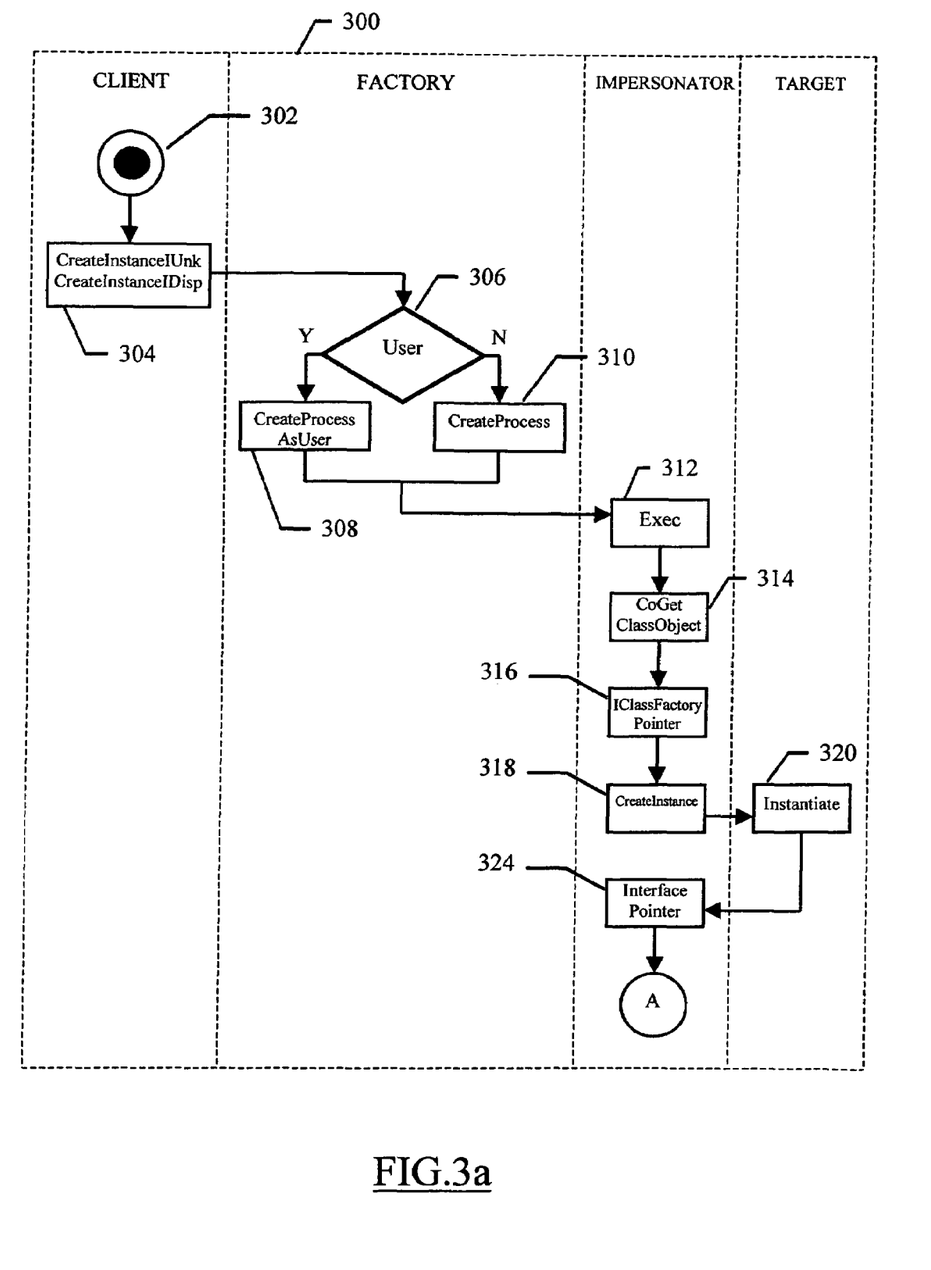
FIGS. 3a-3d show the flow of activity relating to the implementation of an embodiment of the invention.

In response thereto, the factory at block 306 verifies whether the context information requires the instantiation of the target component in a process impersonating a user different from the current one. If so, a new process is created at block 308 calling the system method "CreateProcessAsUser" (with the indication of the desired user); otherwise, the new process is created at block 310 calling the system method "CreateProcess". In both cases, the factory passes a command line consisting of the name of the impersonator to be executed (as its primary thread); a list of arguments is used to pass the CLSID of the class, the IID of the initializing interface and the context information (received from the client).

The flow of activity merges at block 312, wherein the execution of the impersonator is started in the newly created process. Continuing to block 314, the impersonator calls the system method "CoGetClassObject", passing the CLSID of the class and the IID of the interface "IClassFactory". The method "CoGetClassObject" returns the pointer to that interface at block 316. Proceeding to block 318, the target component is instantiated in the process of the impersonator (as a secondary thread); for this purpose, the impersonator calls the method "CreateInstance" on the pointer to the interface "IClassFactory", passing the IID of the initializing interface. In response thereto, the target component is instantiated at block 320 in the respective swim-lane (with its reference counter that is automatically incremented through the method "AddRef").

Figure 3B:
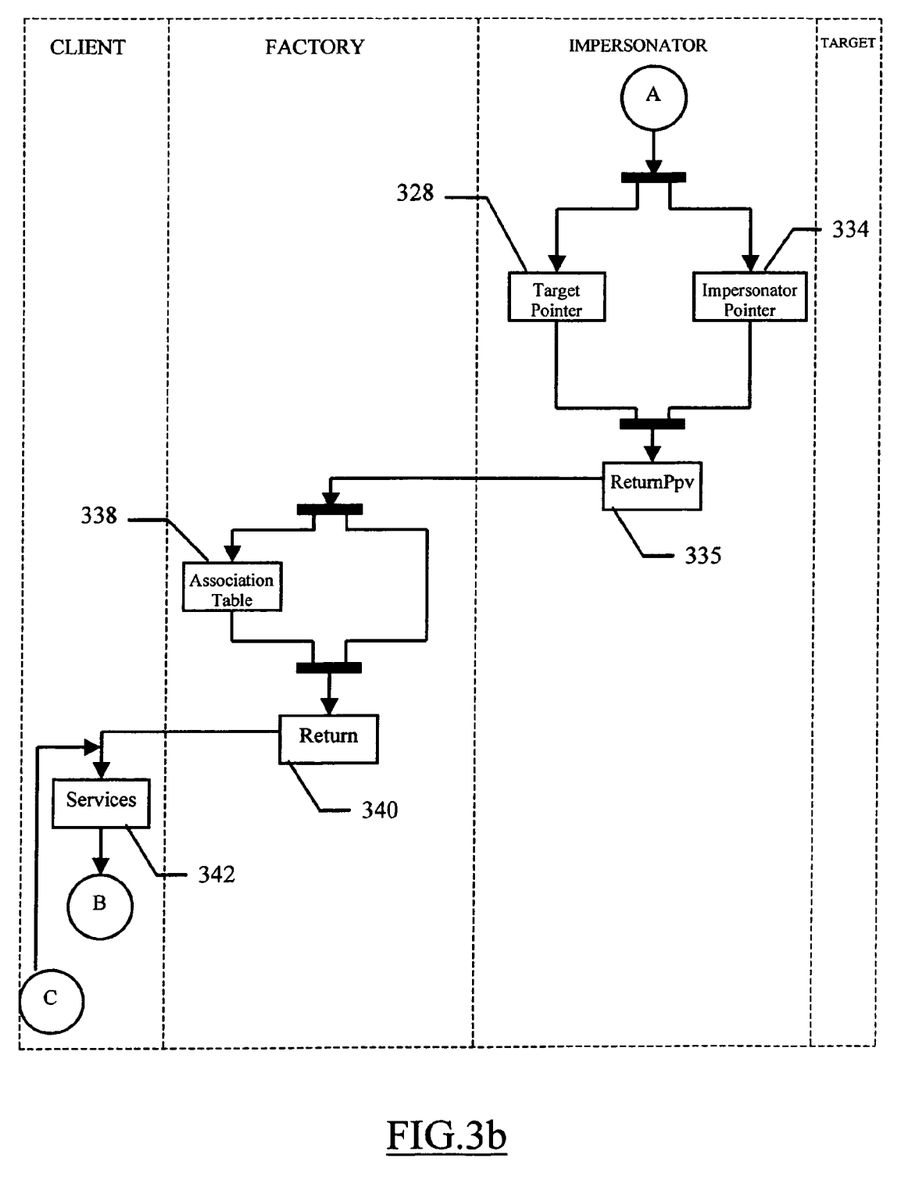

The pointer to the initializing interface of the target component is returned to the impersonator at block 324. The flow of activity then forks into two branches that are executed alternatively according to the method that was called by the client on the factory. Particularly, when the client called the method "CreateInstanceIUnk" the pointer to the initializing interface of the target component is set at block 328 as the pointer to be returned to the factory. Conversely, when the client called the method "CreateInstanceIDisp" the pointer to the initializing interface ("IDispatch") of the impersonator is set at block 334 as the one to be returned to the factory. In both cases, the impersonator at block 335 calls the method "ReturnPpv" on the factory passing the selected pointer.

Returning to the swim-lane of the factory, if the client called the method "CreateInstanceIUnk" the association table is updated accordingly at block 338 (inserting a new entry that associates a newly generated identifier of the target component with the handle of the impersonator process, being returned by the system methods "CreateProcess" or "CreateProcessAsUser"); the method then continues to block 340. Conversely, if the client called the method "CreateInstanceIDisp" the flow of activity descends into block 340 directly.

Figure 3C:
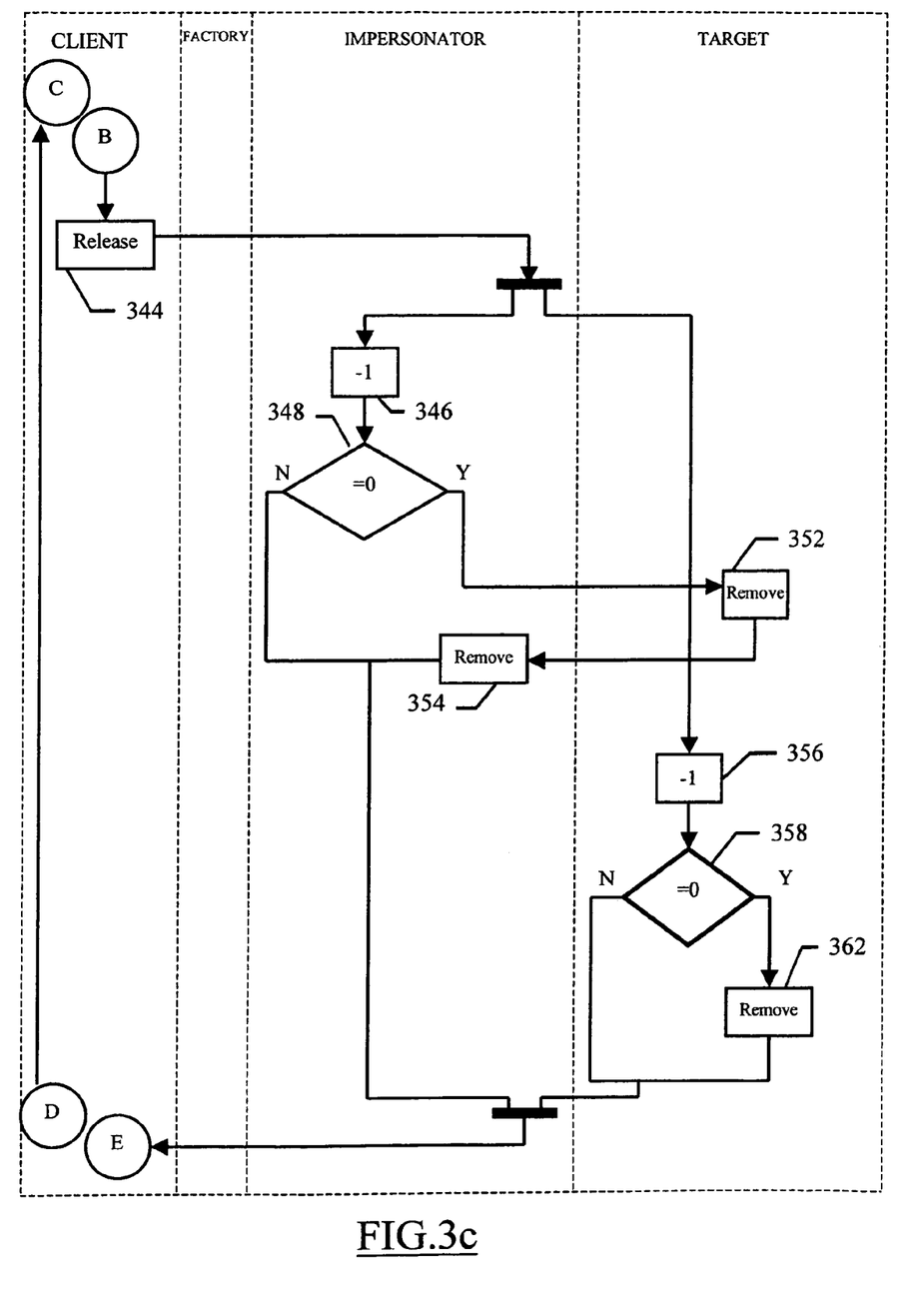

Considering now block 340, the factory returns the pointer received from the impersonator to the client. In this way, the client at block 342 can now access the services offered by the target component (either directly or through the impersonator). Particularly, when the custom component is not wrapped by the impersonator, the client can move to a different interface (through the method "QueryInterface") and then call any desired method that is exposed. Conversely, the client can call the method "Invoke" (of the interface "IDispatch") passing information about the desired member to be invoked; the impersonator in turn executes the desired operation exploiting the target component, and returns its result to the client.

Once the client does not need the target component any longer, the method "Release" is called on the current interface (identified by the corresponding pointer) at block 344. As a consequence, when the impersonator wraps the target component the method "Release" is called on the impersonator; in response thereto, the corresponding reference counter is decremented at block 346. The impersonator then verifies at block 348 whether the last reference to the target component has been released (i.e., the reference counter has fallen to 0). If so, the target component dependent on the impersonator is removed at block 352 (in the corresponding swim-lane). The impersonator itself is then removed at block 354; as a consequence, the closure of the last thread of the impersonator process causes its termination as well. The method then continues to block 355 (described in the following). Conversely, if one or more references are still available for the target component the flow of activity descends into block 355 directly from decision block 348.

Referring back to block 344, if the impersonator does not act as a container the method "Release" is called on the target component directly; in response thereto, the same operations described above (with the exception of the removal of the impersonator) are executed at blocks 356-362 on the target component (with the reference counter that is decremented and the target component that is removed when its last reference has been released). The method then descends into block 355.

Figure 3D:
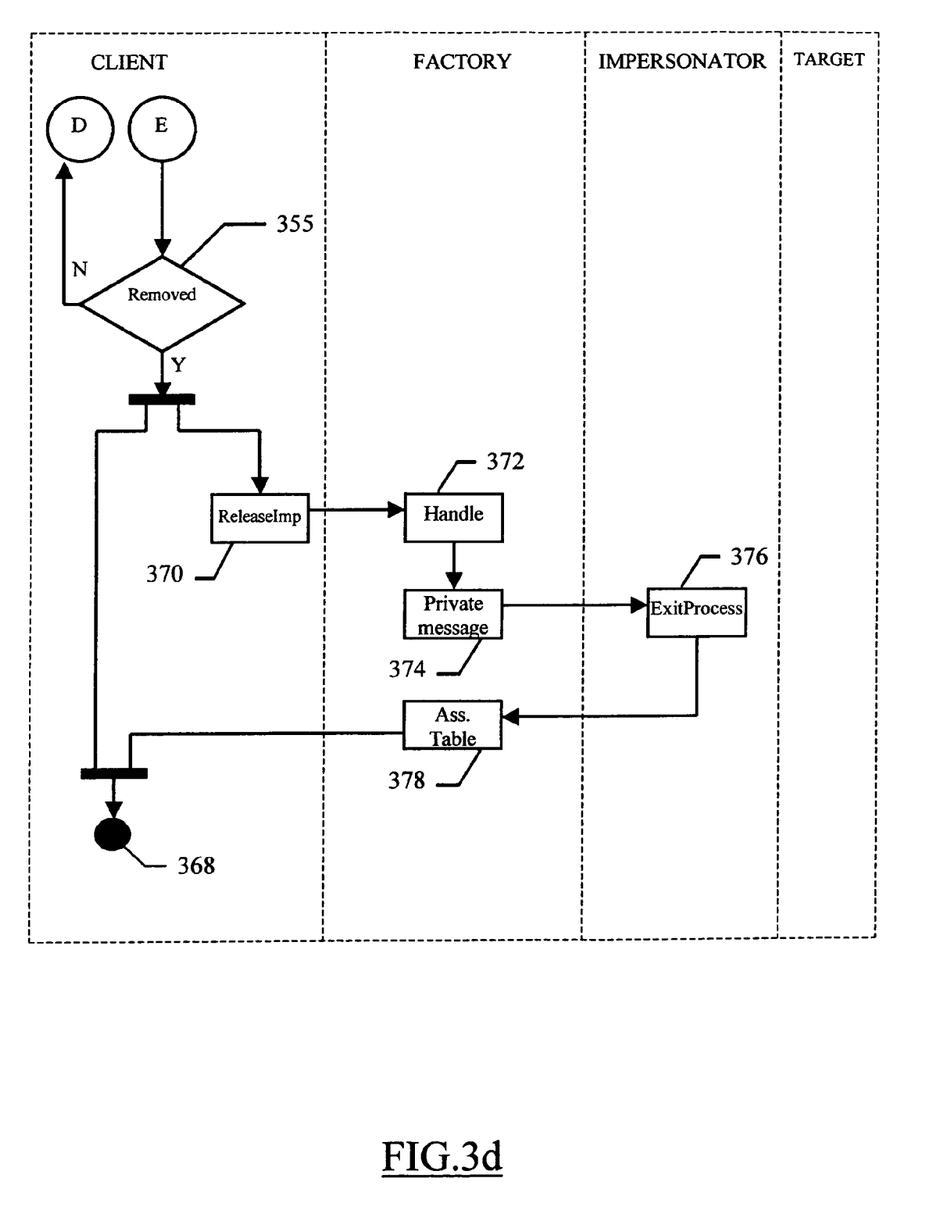

Considering now block 355 (in the swim-lane of the client), if the target component has not been removed the flow of activity returns to block 342, in order to repeat the same operations. On the contrary, the method exits the above-described loop.

If the client called the method "CreateInstanceIDisp", the flow of activity then ends at the concentric white/black stop circles 368. Conversely (method "CreateInstanceIUnk"), the client at block 370 calls the method "ReleaseImp" on the factory (passing the identifier of the target component). Continuing to block 372 in the swim-lane of the factory, the handle of the impersonator process is extracted from the association table (using the identifier of the target component). The method then proceeds to block 374, wherein the factory broadcasts a pre-registered private message for the impersonator. When the impersonator receives that private message, it calls the system method "ExitProcess" to terminate its execution at block 376. Once the impersonator process has been terminated, the factory at block 378 removes the corresponding entry from the association table. The method then ends at the stop circles 368.

Similar considerations apply if an equivalent process is executed or if additional functions are provided. In any case, the concepts of the present inventions are also applicable when the target component is instantiated using another initializing interface (for example, defining operations that are common to a set of components); alternatively, a different procedure is used for instantiating the target component (for example, just invoking the system method "CoCreateInstance" or the system method "CoCreateInstanceEx" for directly instantiating a single component on the local computer or on a remote computer, respectively, or exploiting helper methods that manage the instantiation of compound components). Moreover, the impersonator can wrap the target component even if it does not implement the interface "IDispatch" (for example, when the target component consists of a custom component which methods are known a priori), or the impersonator process can be terminated in another way (for example, calling the system method "TerminateProcess" by the factory).

More generally, the present invention proposes a method of instantiating software components; each component conforms to a component-based specification, which requires the instantiation in one or more predefined contexts. The method of the invention includes a series of steps that are carried out under the control of an auxiliary component. The method starts with receiving a request from a client; the request includes an indication of a target component and a corresponding target context. The auxiliary component causes the instantiation of the target component in a target process, which is configured according to the target context. An identifier for accessing the target component is then returned to the client.

The method of the invention allows instantiating the components in custom contexts.

In this way, the contexts of the components can be defined at run-time.

In other words, the proposed solution provides a support for controlling the contexts of the components dynamically.

It should be noted that the above-mentioned results are achieved without updating the target component (with all the operations for its instantiation in the desired context that are masked by the auxiliary component).

The preferred embodiment of the invention described above offers further advantages.

Particularly, the target component is instantiated through the impersonator.

This additional feature is required for allowing instantiating the target components in custom contexts even when they are in-process (conversely, those kind of target components would be always instantiated in the same process of the factory).

As a further enhancement, the impersonator is released in response to the release of the corresponding target component.

This feature allows cleaning up the environment correctly once the target component is not needed any longer.

In any case, the implementation of the proposed solution without any support for explicitly releasing the impersonator is not excluded (for example, with the corresponding process that is terminated when the system is shut down). Moreover, the structure of the present invention is also suitable to be implemented even without the impersonator; for example, this simplified structure can be used with custom out-of-process components, which are instantiated in the desired target contexts by the factory directly.

In a preferred embodiment of the invention, the factory extends a standard interface (which exposes a standard method for instantiating the components) by providing one or more additional instantiation methods (which allow passing the desired context information).

The proposed implementation only involves minor changes to the clients.

Advantageously, the factory returns an identifier (for accessing the target component) that is set according to the pointer being returned by the standard instantiation method.

In this way, the access to the target component in the custom context is completely opaque to the client.

However, the solution according to the present invention leads itself to be implemented returning another identifier of the target component to the client, or even with a different mode of passing the request of the client to the factory.

In a particular embodiment of the invention, the client accesses the target component directly (through its pointer); in this case, the impersonator is released by the factory in response to a dedicated method that is called by the client.

The proposed solution is of general applicability (irrespective of the type of target component), and only requires an additional operation by the client for releasing the impersonator.

Alternatively, the impersonator wraps the target component and controls its removal directly.

In this case, the removal of the impersonator is completely automatic (however, this approach can be used only when the target component implements an invocation method for calling its methods or when the methods of the target components are known a priori).

In any case, the proposed solution is also suitable to be implemented with different procedures for terminating the impersonator process (for example, with the impersonator that monitors the corresponding target component to detect its removal).

The structure according to the present invention is specifically designed for the COM specification (even if the application in equivalent component-based specifications that only support the instantiation in predefined contexts is not excluded).

Advantageously, the devised solution is implemented with a computer program, which is provided as a corresponding product stored on a suitable medium.

Alternatively, the program is pre-loaded onto the hard-disk, is sent to the computer through the INTERNET, is broadcast, or more generally is provided in any other form directly loadable into the working memory of the computer. However, the method according to the present invention leads itself to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims

What is claimed is:

1. A method of instantiating software components, each component conforming to a component-based specification requiring the instantiation in at least one predefined context, wherein the method includes the steps of:
   receiving, under control of an auxiliary component, the auxiliary component being a factory module, a request from a client to instantiate a target component, the request including an indication of the target component and a corresponding target context, the target context defining a domain in which the target component will execute, wherein the target context includes information about availability and configuration of (i) a security resource, (ii) a scheduling priority of the target process;
   causing, under the control of an auxiliary component, the instantiation of the target component in a target process being configured according to the target context, wherein the causing includes the auxiliary component starting execution of an intermediate module in the target process passing the indication of the target component and the intermediate module instantiating the target component in-process, the intermediate module being an impersonator module, wherein each component implements a predefined interface exposing at least one instantiation method for instantiating the component in a predefined context, and wherein the auxiliary component extends the interface with at least one further instantiation method for receiving the request from the client, the auxiliary component starting the execution of the intermediate module in response to the calling of the at least one further instantiation method, and the intermediate module instantiating the target component by calling the corresponding at least one instantiation method; and
   returning, under the control of an auxiliary component, an identifier for accessing the target component to the client.

2. The method according to claim 1, wherein the step of returning the identifier for accessing the target component to the client includes:
   the intermediate module calling a service method exposed by the auxiliary component passing the identifier, and
   the auxiliary component returning the identifier to the client through the at least one further instantiation method.

3. The method according to claim 2, wherein the identifier consists of a pointer to the target component being returned through the at least one instantiation method and wherein the further request is provided by calling a release method exposed by the target component, the method further including the step of storing an association between the target component and the intermediate module by the auxiliary component, the step of releasing the intermediate module including:
  the client calling a further release method exposed by the auxiliary component passing an indication of the target component,
  the auxiliary component associating the target component with the corresponding intermediate module, and
  the auxiliary component causing the release of the intermediate module.

4. The method according to claim 2, wherein the intermediate module is an intermediate component wrapping the target component, the identifier consisting of a further pointer to the intermediate component, and wherein the further request is provided by calling a release method exposed by the auxiliary component, the steps of releasing the target component and the intermediate component including:
  the intermediate component releasing the target component, and
  terminating the execution of the intermediate component.

5. The method according to claim 1, further including the steps of:
  releasing the target component in response to a further request of the client; and
  releasing the intermediate module in response to the release of the target component.

6. The method according to claim 1, wherein the components conform to the COM (Component Object Model) specification.

7. The method of claim 1, wherein the target context further includes information about availability and configuration of an appearance property of the target process, and wherein the target context specifies a user to be impersonated by the target process.

8. The method of claim 7, wherein the target context further includes information about an environment block, the environment block including at least one pair of an environment variable name and a value corresponding to the environment variable.

9. A computer program product in a computer readable medium for performing a method of instantiating software components when the program is run on a data processing system, each component conforming to a component-based specification requiring the instantiation in at least one predefined context, wherein the method includes the steps under the control of an auxiliary component of:
  receiving, under control of an auxiliary component, the auxiliary component being a factory module, a request from a client to instantiate a target component, the request including an indication of the target component and a corresponding target context, the target context defining a domain in which the target component will execute, wherein the target context includes information about availability and configuration of (i) a security resource, (ii) a scheduling priority of the target process;
  causing the instantiation of the target component in a target process being configured according to the target context, wherein the causing includes the auxiliary component starting execution of an intermediate module in the target process passing the indication of the target component and the intermediate module instantiating the target component in-process, the intermediate module being an impersonator module, wherein each component implements a predefined interface exposing at least one instantiation method for instantiating the component in a predefined context, and wherein the auxiliary component extends the interface with at least one further instantiation method for receiving the request from the client, the auxiliary component starting the execution of the intermediate module in response to the calling of the at least one further instantiation method, and the intermediate module instantiating the target component by calling the corresponding at least one instantiation method; and
  returning an identifier for accessing the target component to the client.

10. The computer program product of claim 9, wherein the target context further includes information about availability and configuration of an appearance property of the target process, and wherein the target context specifies a user to be impersonated by the target process.

11. The computer program product of claim 9, wherein the target context further includes information about an environment block, the environment block including at least one pair of an environment variable name and a value corresponding to the environment variable.

12. A system for instantiating software components, each component conforming to a component-based specification requiring the instantiation in at least one predefined context, the system comprising:
  a storage device including a storage medium, wherein the storage device stores computer usable program code; and
  a processor, wherein the processor executes the computer usable program code, and wherein the computer usable program code includes computer usable code for an auxiliary component, the computer usable code for the auxiliary component comprising:
  computer usable code for receiving, under control of an auxiliary component, the auxiliary component being a factory module, a request from a client to instantiate a target component, the request including an indication of the target component and a corresponding target context, the target context defining a domain in which the target component will execute, wherein the target context includes information about availability and configuration of (i) a security resource, (ii) a scheduling priority of the target process;
  computer usable code for causing the instantiation of the target component in a target process being configured according to the target context, wherein the computer usable code for causing includes computer usable code for the auxiliary component starting execution of an intermediate module in the target process passing the indication of the target component and computer usable code for the intermediate module instantiating the target component in-process, the intermediate module being an impersonator module, wherein each component implements a predefined interface exposing at least one instantiation method for instantiating the component in a predefined context, and wherein the auxiliary component extends the interface with at least one further instantiation method for receiving the request from the client, the auxiliary component starting the execution of the intermediate module in response to the calling of the at least one further instantiation method, and the intermediate module instantiating the target component by calling the corresponding at least one instantiation method; and
  computer usable code for returning an identifier for accessing the target component to the client.

13. The system of claim 12, wherein the target context further includes information about availability and configuration of an appearance property of the target process, and wherein the target context specifies a user to be impersonated by the target process.

14. The system of claim 12, wherein the target context further includes information about an environment block, the environment block including at least one pair of an environment variable name and a value corresponding to the environment variable.

\* \* \* \* \*